United States Patent
Thuries (10) Patent No.: US 8,295,640 B2
(45) Date of Patent: Oct. 23, 2012

(54) NOISE REDUCTION BY IMAGE SUBTRACTION IN AN AUTOMATIC DATA COLLECTION DEVICE, SUCH AS AN IMAGE ACQUISITION DEVICE

(75) Inventor: Serge Thuries, Saint Jean (FR)

(73) Assignee: Intermec IP Corp., Everett, WA (US)

( * ) Notice: Subject to any disclaimer, the term of this patent is extended or adjusted under 35 U.S.C. 154(b) by 1156 days.

(21) Appl. No.: 11/995,189

(22) PCT Filed: Jul. 13, 2006

(86) PCT No.: PCT/US2006/027107
§ 371 (c)(1),
(2), (4) Date: Jun. 24, 2008

(87) PCT Pub. No.: WO2007/009005
PCT Pub. Date: Jan. 18, 2007

(65) Prior Publication Data
US 2008/0267537 A1    Oct. 30, 2008

Related U.S. Application Data

(60) Provisional application No. 60/699,362, filed on Jul. 13, 2005.

(51) Int. Cl.
*G06K 9/40* (2006.01)

(52) U.S. Cl. .................................................. 382/275

(58) Field of Classification Search .......... 382/274–275, 382/254, 309, 312; 358/3.26–3.27; 235/462.01–462.24, 494, 472.01
See application file for complete search history.

(56) References Cited

U.S. PATENT DOCUMENTS

| | | | |
|---|---|---|---|
| 4,988,852 A | | 1/1991 | Krishnan |
| 5,120,940 A | * | 6/1992 | Willsie ............... 235/462.08 |
| 5,378,883 A | | 1/1995 | Batterman et al. |
| 5,877,486 A | | 3/1999 | Maltsev et al. |
| 6,286,763 B1 | | 9/2001 | Reynolds et al. |
| 6,330,974 B1 | | 12/2001 | Ackley |
| 6,732,930 B2 | | 5/2004 | Massieu et al. |

FOREIGN PATENT DOCUMENTS

WO    02/31749 A1    4/2002

* cited by examiner

*Primary Examiner* — Ishrat I Sherali
(74) *Attorney, Agent, or Firm* — Seed IP Law Group PLLC (57) ABSTRACT

An automatic data collection device (10) and method reads images from display screen (22) of an electronic display device (24), such as a cellular telephone. The method reads a flashing image of a target machine-readable symbol (12) displayed on the display screen, by obtaining at least two images of the display screen. In the first image, the image of the target machine-readable symbol is present. In the second image, the image of the target machine-readable symbol (12) is absent. The second image of the display screen, when the image of the target machine-readable symbol is absent, comprises noise and other images that are irrelevant to the decoding process. This noise in the second image is subtracted from the first image of the display screen having the image of the target machine-readable symbol displayed thereon the symbol. A resulting image from the image subtraction is an improved image of the target machine-readable symbol.

30 Claims, 5 Drawing Sheets

NOISE REDUCTION BY IMAGE SUBTRACTION IN AN AUTOMATIC DATA COLLECTION DEVICE, SUCH AS AN IMAGE ACQUISITION DEVICE

CROSS REFERENCE TO RELATED APPLICATIONS

The present application is a national stage application of Patent Cooperation Treaty (PCT) Application Serial No. PCT/US2006/027107, filed Jul. 13, 2006, which in turn claims priority from and the benefit of U.S. Provisional Patent Application Ser. No. 60/699,362, entitled "NOISE REDUCTION BY IMAGE SUBTRACTION," filed Jul. 13, 2005. These applications are assigned to the same assignee as the present application, and incorporated herein by reference in their entireties.

TECHNICAL FIELD

The present disclosure generally relates to the field of automatic data collection (ADC), and more particularly but not exclusively, relates to the optical reading of machine-readable symbols (e.g., barcode symbols, matrix code symbols, stacked code symbols, or other types of machine-readable symbols) and/or other images.

BACKGROUND INFORMATION

The use of cellular telephones and other types of portable wireless electronic devices (e.g., wireless personal digital assistants such as Blackberry®, TREO®) is becoming more ubiquitous in day-to-day transactions and in other activities. For instance, many cellular telephones are provided with a display screen that allows their users to view content from the Internet or from other sources. Further, many cellular telephones are provided with a built-in camera or other imaging component that allows their users to capture images of objects and to view the captured images on the display screen.

One example of an object that can be captured and viewed in a display screen of a portable electronic device (such as a cellular telephone, personal digital assistant or player such as IPOD®) is a machine-readable symbol affixed on an item. The automatic data collection (ADC) arts include numerous systems for representing information in machine-readable form. For example, a variety of symbologies exist for representing information in barcode symbols, matrix or area code symbols, and/or stacked symbols. A symbology typically refers to a set of machine-readable symbol characters, some of which are mapped to a set of human-recognizable symbols such as alphabetic characters and/or numeric values. Machine-readable symbols are typically comprised of machine-readable symbol characters selected from the particular symbology to encode information. Machine-readable symbols typically encode information about an object on which the machine-readable symbol is printed, etched, carried or attached to, for example, via packaging or a tag.

Barcode symbols are a common one-dimensional (1D) form of machine-readable symbols. Barcode symbols typically comprise a pattern of vertical bars of various widths separated by spaces of various widths, with information encoded in the relative thickness of the bars and/or spaces, each of which have different light reflecting properties. One-dimensional barcode symbols require a relatively large space to convey a small amount of data.

Two-dimensional symbologies have been developed to increase the data density of machine-readable symbols. Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual barcode symbols.

Some other examples of two-dimensional symbologies include matrix or area code symbologies (hereinafter "matrix code"). A matrix code symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional barcode symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light reflected from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed with respect to one another. Demodulation typically includes an analog-to-digital conversion and a decoding of the resulting digital signal.

Scanning-type machine-readable symbol readers typically employ a source of coherent light such as a laser diode to produce a beam, and employ a beam deflection system such as a rotating multi-faceted prism or oscillating mirror to scan the resulting beam across the machine-readable symbols. Conventional laser scanning systems employ progressive symbol sampling.

In imaging, the machine-readable symbol reader may flood the machine-readable symbol with light, or may rely on ambient lighting. A one-dimensional (linear) or two-dimensional image (2D) capture device or imager such as a charge coupled device (CCD) array captures a digital image of the illuminated machine-readable symbol, typically by electronically sampling or scanning the pixels of the two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

With regards to the portable electronic devices discussed above that have a display screen, the display screen may present an image of a machine-readable symbol that has been captured by the built-in camera. Alternatively or additionally, the image of the machine-readable symbol may be an attached file from an email, a locally stored image file, an image from an Internet web site, a live broadcast image, or any other type of image that can be presented on the display screen.

BRIEF SUMMARY

An aspect provides a method usable with an imager type automatic data collection device. The method includes obtaining a first image of a display screen of an electronic display device. The first image includes noise and an image of a target machine-readable symbol that is affected by the noise. A second image of the display screen is obtained. The second image has the image of the target machine-readable symbol absent therefrom and includes the noise. The second image is subtracted from the first image to substantially remove the noise and to obtain a third image that includes a resulting improved image of the target machine-readable symbol.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques for noise reduction by image subtraction for an automatic data collection device are described herein. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It may be desirable to read the machine-readable symbol (whether a 1D or 2D image) from the display screen of the portable electronic device, using an automatic data collection device (such as an imaging-type data collection device described above).

One example application involving this scenario is the verification of a passenger's airline boarding pass that has a machine-readable symbol printed on or affixed thereto. At check-in, for instance, the passenger may show the image of the boarding pass displayed in the passenger's cellular telephone to airline security personnel, alternatively to presenting the physical boarding pass. The security personnel can then capture the image of the machine-readable symbol using an imaging-type data collection device, process the captured symbol to decode the underlying data, and then compare the decoded data with official records.

However, there are several technological problems associated with the reading environment that make it difficult to reliably read machine-readable symbols from the display screen of a portable device. One of these problems includes a lack of contrast between the image of the machine-readable symbol and the background of the display screen, if the display screen is not suitably backlit. Other problems that can adversely affect the quality of the image are scratches on the display screen, interference/distortion due to text that is presented on the display screen along with the image of the machine-readable symbol, and/or background reflections off the cover (such as a glass cover) of the display screen. Sometimes, the varying microstructures (including pixel size, pixel arrangement, and/or pixel density) in the display screen can affect the quality of the image. Because of these various problems, the imaging-type data collection device may have difficulty discerning the image of the machine-readable symbol from the background image of the display screen and from noise, and therefore be unable to successfully decode the machine-readable symbol.

A possible method for reading an image presented on a display screen involves capturing and processing multiple frames having the presented image. These successively captured frames of images can then be combined to reduce the noise. However, this method is limited to situations where the overall images are the same from one frame to another. A problem with this method is that there is always a question as to which portion of the overall image in each frame is due to noise and which portion of the overall image in each frame is the desired image.

Another possible method to read an image presented on a display screen is to perform software analysis of the presented image. Such software analysis, however, involves analysis of a single frame of the image to specifically identify the desired image. This single-image software analysis technique can lead to increased errors.

From the discussion above, it is apparent that there is a need for a method of reading machine-readable symbols that are presented by electronic display devices in a manner that reduces signal-to-noise problems and that is more reliable than currently available techniques. To address this need, one embodiment provides a method of reading images from electronic display devices having a display screen, such as cellular telephones or other types of portable wireless (and/or non-portable and wired) electronic display devices, in which an image of a target machine-readable symbol is differentiated from the background noise that distorts the image of the target machine-readable symbol.

An embodiment provides an automatic data collection device that acquires at least two images of a display screen of an electronic display device. Before acquisition of the two images, a target machine-readable symbol is transmitted or otherwise provided to such an electronic display device so that the target machine-readable symbol can be presented on the display screen. Using the data collection device, a first image is taken of the display screen at a time when the machine-readable symbol is presented therein. The data collection device attempts to decode the target machine-readable symbol using the first image. If the machine-readable symbol is successfully decoded by the data collection device, then no further steps need be taken to further decode or otherwise process the first image having the target machine-readable symbol therein.

However, if the attempt by the data collection device to decode the target machine-readable symbol in the first image is not successful (due to noise or other distortion in the first image), then a second image of the display screen is acquired by the data collection device. The second image is taken by the data collection device at a time when the target machine-readable symbol is not being presented by the display screen of the electronic display device.

The first and second images are placed in a memory of the data collection device. If appropriate, alignment calculations can be performed by the data collection device to align the first and second images to each other. In one embodiment, the second image is subtracted from the first image, thereby yielding a high-contrast inverted image of the target machine-readable symbol. The resulting image of the target machine-readable symbol is then decoded by the data collection device.

Such an embodiment operates based on the presence of the image of the target machine-readable symbol in the first image and the absence of the image of the target machine-readable symbol in the second image. Therefore, the entire second image of the display screen, when the image of the target machine-readable symbol image is absent, is comprised of noise and other image portions that are not relevant to the decoding process. This noise, which includes the irrelevant image portions of the second image, is subtracted from the first image of the display screen having the image of the target machine-readable symbol, thereby yielding a dramatically improved image of the target machine-readable symbol by itself.

Figure 1:
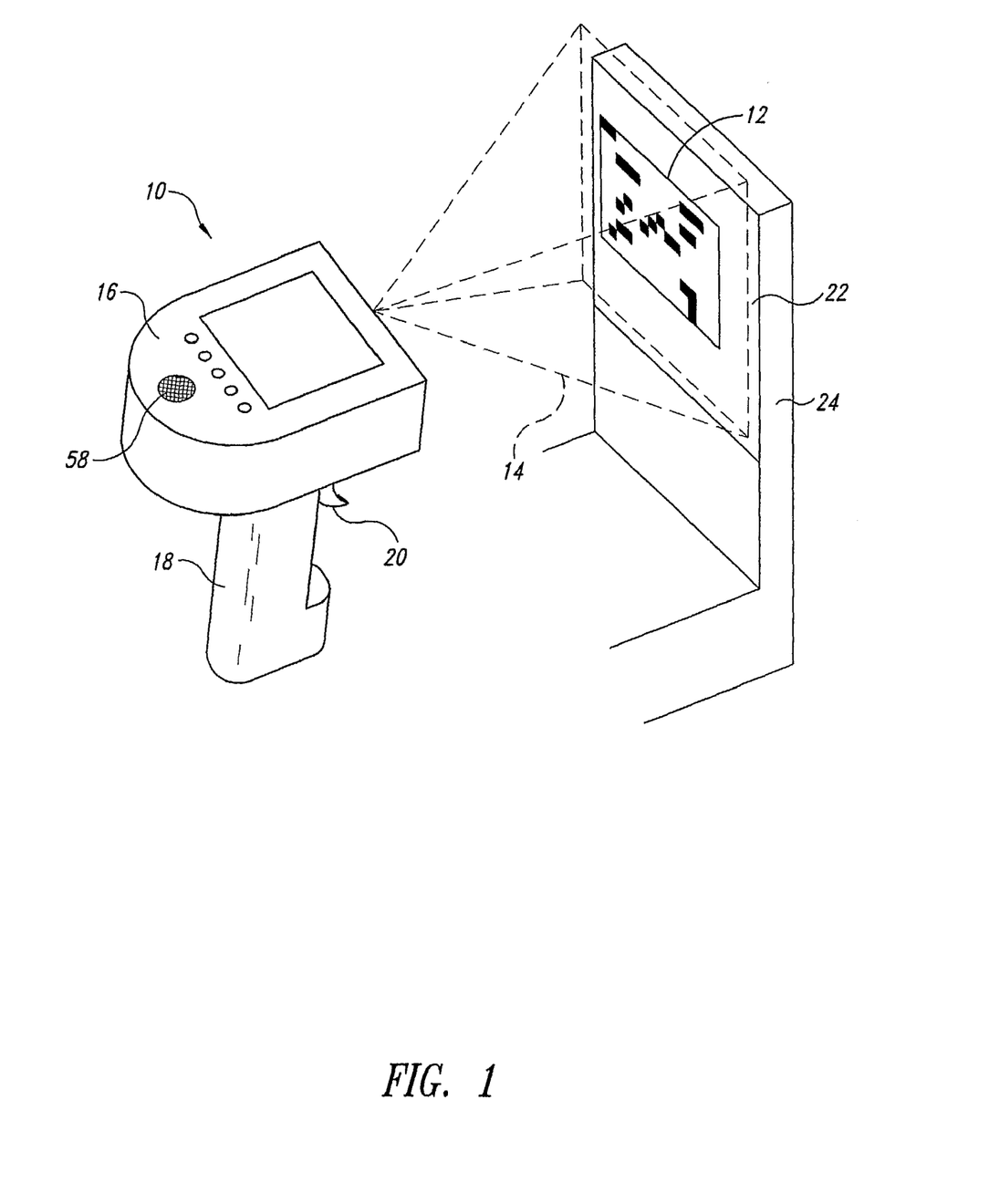
FIG. 1 is an upper isometric view of an embodiment of an automatic data collection device acquiring an image of a target machine-readable symbol that is being presented on a display screen of an electronic display device.

FIG. 1 shows an automatic data collection device 10 for reading one or more target machine-readable symbols, such a matrix code symbol 12 or some other two-dimensional (2D) or one-dimensional (1D) symbol. While the matrix code symbol 12 is illustrated, it is appreciated that the target machine-readable symbol may be embodied as any other type of 1D or 2D symbol that can be read using imaging techniques. Examples of such other target machine-readable symbols include, but are not limited to, a stacked code symbol, a barcode symbol, or other types of 1D or 2D machine-readable symbols, for instance. For the sake of simplicity of explanation hereinafter and unless the context is otherwise, the various embodiments pertaining to the data collection device 10 shown in FIG. 1 and elsewhere will be described with respect to the target machine-readable symbol being in the form of the matrix code symbol 12.

The matrix code symbol 12 is being displayed as an image in a display screen 22 of an electronic display device 24. The electronic display device 24 can comprise a cellular telephone, personal digital assistant (PDA) such as the Palm Pilot®, wireless PDA such as Blackberry® or TREO®, palmtop or laptop computer, audio or video player such as the IPOD®, or other type of portable wired or wireless electronic device. The electronic display device 24 can also comprise a desktop personal computer (PC), network terminal, docked laptop, or other type of hardwired electronic display device with limited portability.

The display screen 22 can comprise a liquid crystal display (LCD) screen, cathode ray tube (CRT) screen, plasma screen, projection screen, digital light processing (DLP) screen, or other type of screen that can be implemented in the electronic display device 24. A person skilled in the art having the benefit of this disclosure will recognize that several different types of screens 22 may be used by the electronic display device 24.

The images (including the image of the matrix code symbol 12) displayed by the display screen 22 can be presented in a raster manner, such as lines of pixels that are refreshed at a certain rate. Alternatively or additionally, the images may be presented as macroblock data. The manner in which images are displayed on the display screen 22 may vary from one electronic display device 24 to another, depending on factors such as the type of display screen used, the type of image-generation technology used, and so forth.

The images may be displayed and refreshed as necessary on the display screen 22, or the images may be substantially static. In one embodiment, the images on the display screen 22 may be refreshed at a certain rate, such that at least a portion of an image is displayed during a first time period, then the image is removed from presentation (thereby leaving substantially "blank" display screen 22) during a second time period, and then the portion of the image is presented again during a third time period. The removal of the image during the second time period can correspond, for example, to a screen-blanking interval in raster-based display systems and/or in macroblock-based display systems.

In another embodiment, the presentation of the images and the blanking of the display screen can be performed manually by the user and/or can be performed automatically based on user/manufacturer settings. Thus, the image can appear to "flash ON" or "flash OFF" on the display screen 22. The "flashing rate" or other intermittent presentation of the image can be set at a sufficiently high rate such that flashing of the image is not human-perceptible—the image appears static to the user of the data collection device 10. The flashing rate can also be set at a slower rate, such as less than ten times per second or some other rate sufficient for human-perceptibility so that the user can visually perceive the flashing.

In an embodiment, the data collection device 10 is operable to acquire images of the display screen 22 both with the image of the matrix code symbol 12 present therein and with the image of the matrix code symbol 12 absent therefrom. For instance, the data collection device 10 can be set such that a first image is acquired automatically when the image of the matrix code symbol 12 is present in the display screen 22 and a second image is acquired automatically when the image of the matrix code symbol 12 is absent from the display screen 22. The timing of the imaging by the data collection device 10 can be set to be at least equal to or greater than the flashing rate of the display screen 22.

In another embodiment, image acquisition can be set at a suitable rate to capture images both during the blanking interval and outside of the blanking interval when an image is present or otherwise maintains some level of persistency.

In another embodiment, if the flashing rate of the display screen 22 is sufficiently slow, the images of the display screen 22 can be acquired manually by the user by pressing a trigger 20 (or via other manual user activation) each time when the user sees the image of the matrix code symbol 12 and when the user sees the matrix code symbol 12 disappear from the display screen 22.

In one embodiment, the images of the "blank" display screen 22 correspond to a situation where the display screen 22 remains activated—the image of the matrix code symbol 12 is just not displayed thereon. In such a situation, at least some of the pixels of the display screen 22, displayed text, backlighting, or other screen-related elements may remain energized or otherwise activated. In another embodiment, the images of the "blank" display screen 22 may correspond to a situation where the display screen 22 is deactivated, with minimal or no screen elements energized. In such a situation, the data collection device 10 can still capture images of the deactivated display screen 22 to the extent that such images are influenced by reflections from its screen cover, dirt or scratches on the screen cover, ambient lighting, microstructures of the display screen, or other factors that may affect the quality of the images.

In one embodiment, the image of the matrix code symbol 12 may be obtained by the electronic display device 24 using a camera (not shown) that is integrated in the electronic display device 24. For instance, a user of the electronic display device 24 may "take a picture" or acquire an image of an item having the matrix code symbol 12 affixed or printed thereon. The user may also simply point the camera at the item, without necessarily "taking a picture" with a "shutter release," so that the image of the matrix code symbol 12 appears on the display screen 22 for viewing and acquisition by the data collection device 10. In other embodiments, the image of the matrix code symbol 12 may be retrieved by the electronic display device from local storage and/or from a remote network location, such as a web site on the Internet. In still other embodiments, the image of the matrix code symbol 12 may be transmitted to the electronic display device 24 for display on the display screen 22, such as via a live broadcast, as an email attachment, and so forth. A person skilled in the art having the benefit of this disclosure will recognize that many different techniques may be used to obtain an image of the matrix code symbol 12 for presenting in the display screen 22.

The data collection device 10 includes a head 16, a handle 18, and an actuator such as the trigger 20. While the trigger 20 is shown with a specific shape and in a specific location in the embodiment of FIG. 1, other embodiments may employ different arrangements. For example, the trigger 20 can be embodied as a side-mounted finger trigger, top-mounted thumb trigger, button or key, touch screen, and other trigger arrangements. One embodiment further provides a proximity trigger, which uses optics, acoustics, or other mechanism to determine proximity of an object to automatically activate without requiring a user to pull the trigger. In one embodiment, the trigger 20 can be implemented as a multi-position trigger that can be pulled/pressed in stages. For example, an initial press (e.g., pressing the trigger 20 halfway) can be used to perform initial illumination and image acquisition for automatic focusing purposes, and a further press (e.g., further pressing the trigger 20 to its fully pressed position) can be used to perform final image acquisition. In yet other embodiments, image acquisition (whether initial image acquisition during the automatic focusing process and/or final image acquisition) can be automatically initiated after expiration of a set time period after the data collection device has been pointed at the matrix code symbol 12, or automatically initiated after sensing a lack of movement of the data collection device 10, generally indicating that the data collection device 10 is being pointed at a desired target machine-readable symbol.

The data collection device 10 can comprise a portable data collection device, a hand-held imager type device, or other suitable electronic device having the various data reading capabilities described herein. It is appreciated that some embodiments are provided that may not necessarily have the same shape or identical features or identical use as the embodiments illustrated in the various figures. However, such embodiments can nevertheless include embodiments of the noise reduction features described herein.

The embodiment of the data collection device 10 of FIG. 1 generates an illumination beam 14, which is symbolically depicted in broken lines as one or more beams of light directed at the matrix code symbol 12 and having a generally rectangular illumination pattern. It is appreciated that such illumination pattern produced by the aiming beam 14 can comprise various other shapes such as substantially square, elliptical, circular, and so forth. In an embodiment, illumination of the target matrix code symbol 12 may be provided partly or entirely by ambient light.

The aiming beam 14 has a field-of-view (FOV) such that the entire image of the target matrix code symbol 12 falls within the FOV. In certain situations, such as depicted in FIG. 1, the FOV may also encompass portions of the display screen 22 that lie outside of the image of the matrix code symbol 12 and may further encompass portions of the electronic display device 24 that lie outside of the display screen 22 and/or areas lying completely off the electronic display device 24. As a result, the overall image captured by the data collection device 10 can comprise a first image portion that includes the image of the matrix code symbol 12, and a second image portion that includes the areas of the display screen 22 and other areas that lie outside of the image of the matrix code symbol 12, as well as areas that overlap into the image of the matrix code symbol 12. As will be explained in greater detail below, an embodiment of an image subtraction technique is able to obtain a difference between the first image portion and the second image portion, thereby resulting in an improved image of the matrix code symbol 12.

Figure 2:
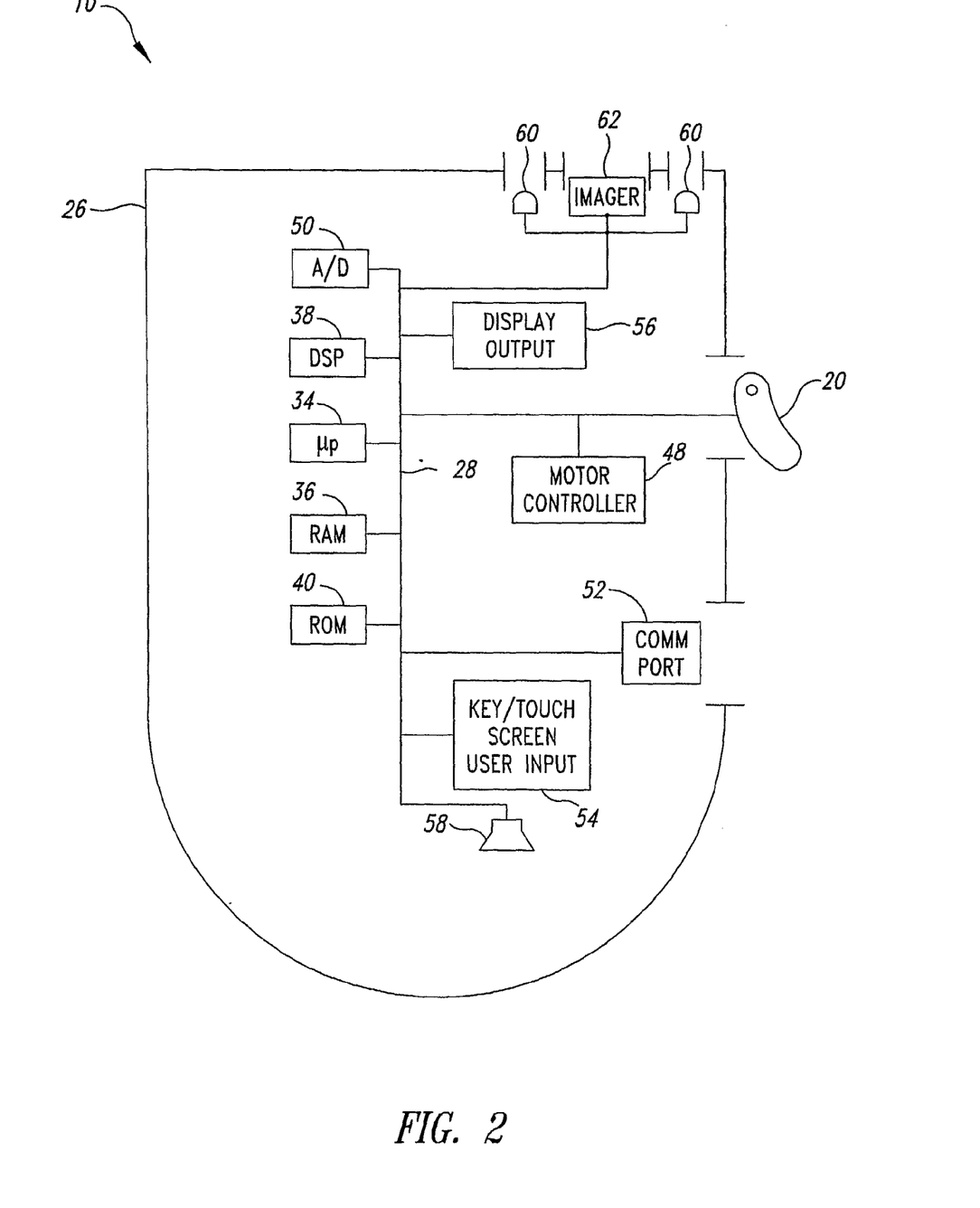
FIG. 2 is a functional block diagram of one embodiment of the data collection device of FIG. 1.

FIG. 2 is a block diagram of one embodiment of the data collection device 10 that can implement the features described above, and particularly a data collection device 10 that is able to perform image subtraction to reduce noise in an image. While such a block diagram depicts a dedicated 2D and/or 1D data collection device that uses imaging, such embodiment(s) are illustrated and described in this manner for the sake of convenience. The features depicted in the illustrated embodiments can be suitably supplemented with other components, so as to provide a multi-mode data collection device that is operable to read any one or more of 1D, 2D, or other type of machine-readable symbols using imaging or scanning, and which may additionally read other types of automatic data collection (ADC) data carriers, including RFID and/or acoustical data carriers, for example.

As shown in the embodiment of FIG. 2, the data collection device 10 has a housing 26 that carries various components, symbolically shown as being coupled together via a bus 28. The bus 28 provides data, commands, and/or power to the various components of the data collection device 10. The data collection device 10 can include an internal power source such as a rechargeable battery (not shown), or can receive power from an external power source such as a wall outlet by way of an electrical cord (not shown).

The data collection device 10 may include one or more flood illumination sources 60, such as a plurality of light sources, to substantially illuminate a target symbol such as the matrix code symbol 12. The flood illumination source 60 can be in the form of one or more LED light sources, or other suitable type of light source(s) that can be used for target illumination in the manner previously described above.

A motor controller 48 can be provided for a variety of purposes. The motor controller 48 can control movement of the illumination source(s) 60 and/or can control movement of a reflective mirror (or other mechanical or optical element) that focuses the illumination onto the target matrix code symbol 12, for example. The motor controller 48 can also be used to control a mirror, prism, lens and/or other mechanical or other optical element to focus or otherwise direct the returned image (from the target matrix code symbol 12) onto an imager or image detector 62 (or other image array or image sensor).

The image detector 62 is positioned to receive illumination returned from the target matrix code symbol 12 during image acquisition of the matrix code symbol 12. The image detector 62 can take the form of a one- or two-dimensional charge coupled device (CCD) array, for example, or other suitable image sensor or image array. The image detector 62 of various embodiments can implement linear imagers, 2D imagers, or other types of imagers usable with a variety of light sources. In certain embodiments, the data collection device 10 can omit or reduce the output of the illumination source 60 for purposes of image acquisition, for example where the image detector 62 is a two-dimensional CCD array operable with ambient light.

The data collection device 10 of FIG. 2 includes at least one microprocessor, controller, microcontroller, or other processor, which are symbolically shown as a single microprocessor 34. It is appreciated that the data collection device 10 may include separate dedicated processors for reading and processing matrix code symbols, RFID tags, acoustical tags, barcode symbols, other data carriers, and the like, as well as one or more processors for controlling operation of the data collection device 10.

Moreover, in one exemplary embodiment, at least one digital signal processor (DSP) 38 may be provided to cooperate with the microprocessor 34 to process signals and data returned from the symbols. Such signal processing may be performed for purposes of reading data from signals received from the target symbol. For instance during decoding, the DSP 38 can perform image processing to extract the underlying data from the captured image of the matrix code symbol 12. Furthermore, the DSP 38 and/or the microprocessor 34 can perform various embodiments of an image subtraction algorithm in which pixels from a second image are subtracted from pixels of a first image (or vice versa) in order to yield an improved image of the matrix code symbol 12.

Furthermore, the microprocessor 34 can execute software or other machine-readable instructions stored in a machine-readable storage medium in order to perform the image processing (including image subtraction), decoding or to otherwise control operation of the data collection device 10, including controlling the timing of image acquisition in a manner that various images of the display screen 22 (with and without the image of the matrix code symbol 12 displayed thereon) can be acquired. Such storage medium can be embodied by a random access memory (RAM) 36, a read only memory (ROM) 40, or other storage medium. The software stored in the storage medium can include the image subtraction algorithm.

Further in an embodiment, the ROM 40 stores instructions for execution by the microprocessor 34 to operate the various components of the data collection device 10. For example, the ROM 40 contains instructions for the microprocessor 34 that permit the microprocessor 34 to control the image detector 62 to capture image data (including image acquisition timing) and to decode and/or manipulate the captured image data. As used in this herein, ROM includes any non-volatile memory, including erasable memories such as EEPROMs.

The RAM 36 is provided to temporarily store data, such as a captured image data from the image detector 62. The RAM 36 can also store other types of data, such as variable values, results of calculations, state data, or other information. Therefore in an embodiment, the images of the display screen 22 (with and without the image of the matrix code symbol 12), the intermediate values obtained during execution of the image subtraction algorithm, and/or resulting image of the matrix code symbol after execution of the image subtraction algorithm can be stored in the RAM 36.

An analog-to-digital (A/D) converter 50 can be used if necessary to transform various analog electrical signals to digital form, such as communication signals or user input signals. The bus 28 couples the digital data from the A/D converter 50 to the microprocessor 34 and the RAM 36.

Symbol reading and decoding technology is well known in the art and will not be discussed in further detail. Many alternatives for image sensors, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10 can include a communication port 52 to provide communications to external devices. The communication port 52 can be a hardwire or wireless interface, and can even employ an antenna, radio, USB connection, Ethernet connection, modem, or other type of communication device. The communication port 52 can provide communications over a communications network (not shown) to a host (not shown), allowing transmissions of data and/or commands between the data collection device 10 and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. It is appreciated that other devices for providing user input can be used. The user input device 54 is usable to allow the user to select modes (e.g., modes for reading matrix code symbols, barcode symbols, or other symbols), turn the data collection device 10 ON/OFF, adjust power levels, and others. The bus 28 couples the user input device 54 to the microprocessor 34 to allow the user to enter data and commands.

The bus 28 also couples the trigger 20 to the microprocessor 34. In response to activation of the trigger 20, the microprocessor 34 can cause the illumination source 60 to emit light for target locating. A subsequent or additional pressing of the trigger 20 can be used to activate image acquisition. In various embodiments, different levels and/or sequences of activation of the trigger 20 can result in the performance of different functions.

The data collection device 10 includes human-perceptible visual (e.g., a display output) and audio indicators (e.g., sounds) 56 and 58 respectively. The bus 28 couples the visual and audio indicators 56 and 58 to the microprocessor 34 for control thereby. The visual indicators 56 take a variety of forms, for example: light emitting diodes (LEDs) or a graphic display such as a liquid crystal display (LCD) having pixels. These or other visual indicators can also provide other data associated with the operation of the data collection device 10, such as visual indicators to indicate whether the data collection device 10 is ON/OFF, reading, interrogating, low on battery power, successful or unsuccessful reads/interrogations, and so forth.

The audio indicator 58 can take the sounds from one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a symbol was successfully or unsuccessfully read, low battery power, or other information.

Figure 3:
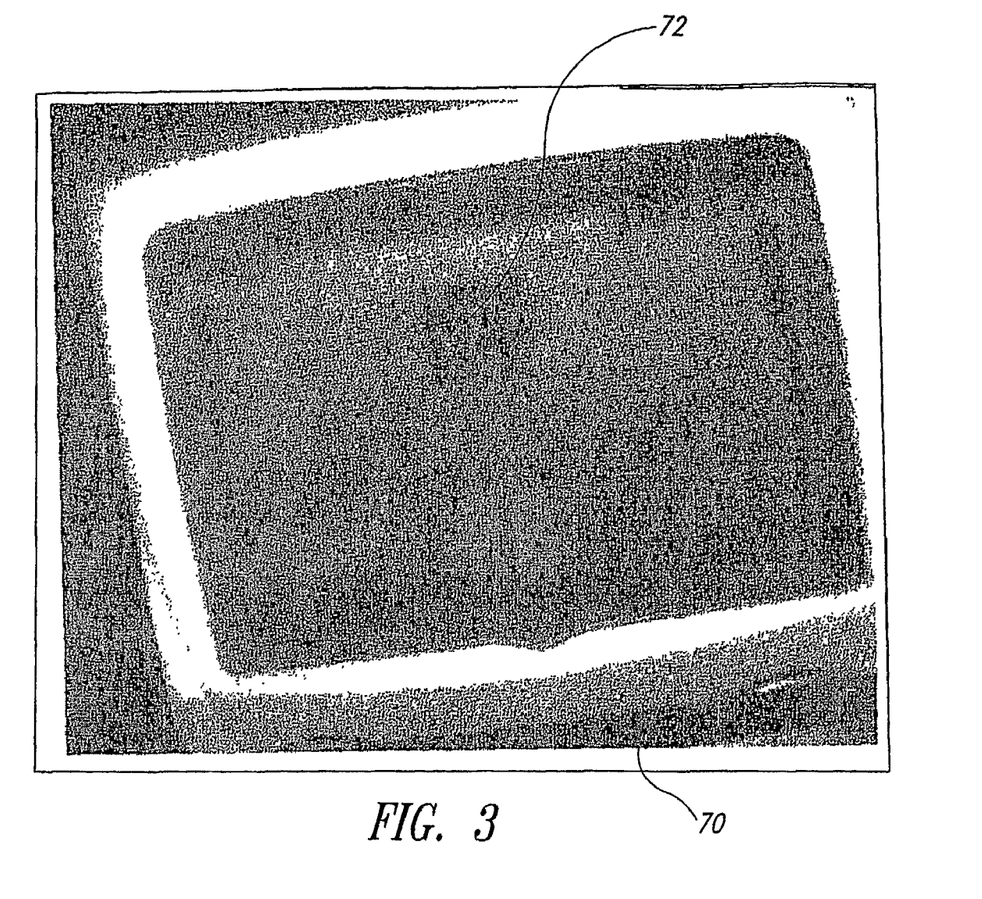
FIG. 3 shows an exemplary image of the display screen of the electronic display device of FIG. 1, with the image of the display screen including the image of the target machine-readable symbol.

FIG. 3 shows an example first or overall image 70 of the display screen 22 having an image 72 of the matrix code symbol 12 displayed therein. As shown in FIG. 3, the overall image 70 can include a first image portion having substantially the entire image 72 of the matrix code symbol 12 and a second image portion having an image of at least a portion of the display screen 22 that lie outside of the image 72. Furthermore, the second image portion of the overall image 70 may also include at least a partial image of adjacent regions of the electronic display device 24 (e.g., housing portions) that lie outside of the display screen 22, as well as partial images of areas that lie completely off the electronic display device 24. Moreover, the second image portion of the overall image 70 can also include an area that overlaps or is otherwise contained within the image 72 of the matrix code symbol 12. This area of the second image portion that is within the image 72 contributes noise or other distortion, which as shown in FIG. 3, affects the quality of the image 72 of the matrix code symbol 12.

Figure 4:
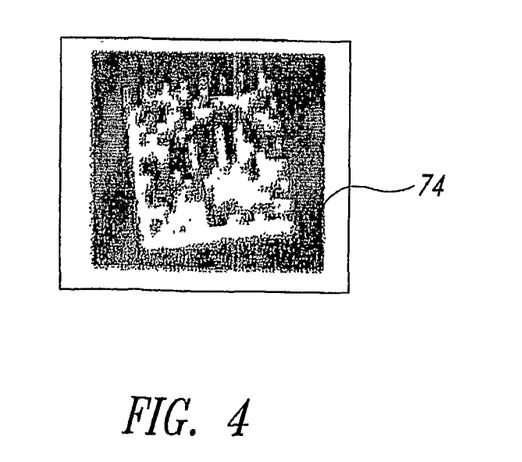
FIG. 4 shows an exemplary resulting image of the machine-readable symbol of FIG. 3 after application of an embodiment of an image subtraction method.

FIG. 4 shows an example of a resulting image 74 (magnified for purposes of clarity of description herein) of the matrix code symbol 12 after performing image subtraction according to an embodiment. The resulting image 74 of FIG. 4 has been obtained after the data collection device 10 has acquired second image of the display screen 22 that does not include the image 72 of the matrix code symbol 12, and has then subsequently obtained a difference between the first and second images through image subtraction. The second image of the display screen 22 does not include the first image portion described above, but instead only includes the second image portion that has the noise, distortion, and perhaps partial images of regions (e.g., housing portions of the electronic display device 24) that are irrelevant to the decoding process. Since the second image portion is present in both the first and second images, the resulting image 74 (after performing image subtraction to remove the second image portions) provides a higher quality (e.g., at least partially devoid of noise) image of the matrix code symbol 12 that can be decoded by the data collection device 10.

Figure 5:
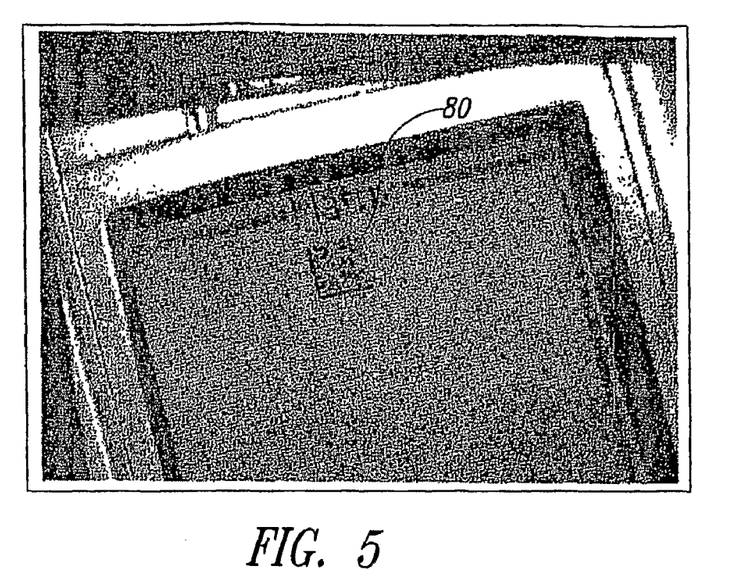
FIG. 5 shows another exemplary image of a display screen of an electronic display device, with the image of the display screen including an image of a target machine-readable symbol.
Figure 6:
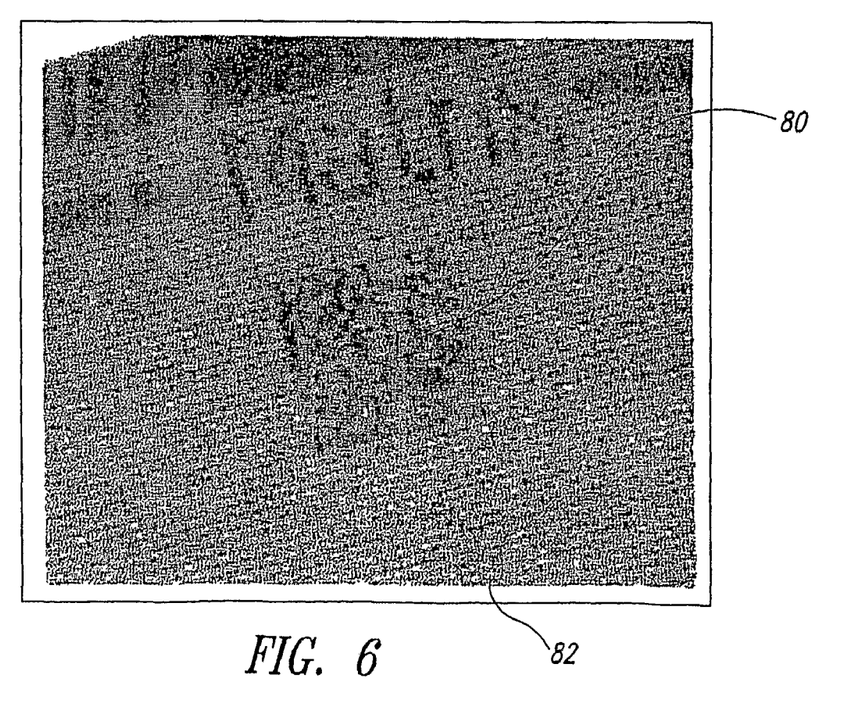
FIG. 6 is an enlarged image of the display screen of FIG. 5.

FIGS. 5 and 6 illustrate a situation where the microstructure of the display screen 22 can affect an image 80 of the matrix code symbol 12. Specifically in FIG. 5, the texture of the display screen 22 is human-perceptible and thus appears as a broken pattern. Such a visible texture may be due to pixel size, pixel density, pixel arrangement, pixel shape, or other factors. As can be better seen in the magnified view of FIG. 6, the individual dimensions and other features of the texture are generally of the same magnitude in size as the individual geometric elements of the matrix code symbol 12. As a result, a basic image subtraction algorithm may not necessarily be able to differentiate between the geometric elements of the matrix code symbol 12 and the texture.

In an embodiment, the situation shown in FIGS. 5-6 can be addressed by first magnifying the image 80 of the matrix code symbol 12, such that the geometric elements of the matrix code symbol 12 become larger in magnitude relative to the individual dimensions and features of the texture. Thus, the geometric elements of the matrix code symbol 12 can be readily discernable from the texture. Thereafter, an image subtraction algorithm can be performed in a manner described above to obtain a higher quality image of the matrix code symbol 12.

The magnification of the image 80 can be performed using a "zoom" feature of the display 22, for example, or a zoom feature of the camera. Alternatively or additionally (if the image 80 of the matrix code symbol 22 was taken using a built-in camera), the camera and/or the item having the matrix code symbol 22 can be placed closer to each other so that a larger image 80 can be obtained. Other pre-processing techniques may be used to help distinguish the image 80 from the texture prior to performing image subtraction.

Figure 7:
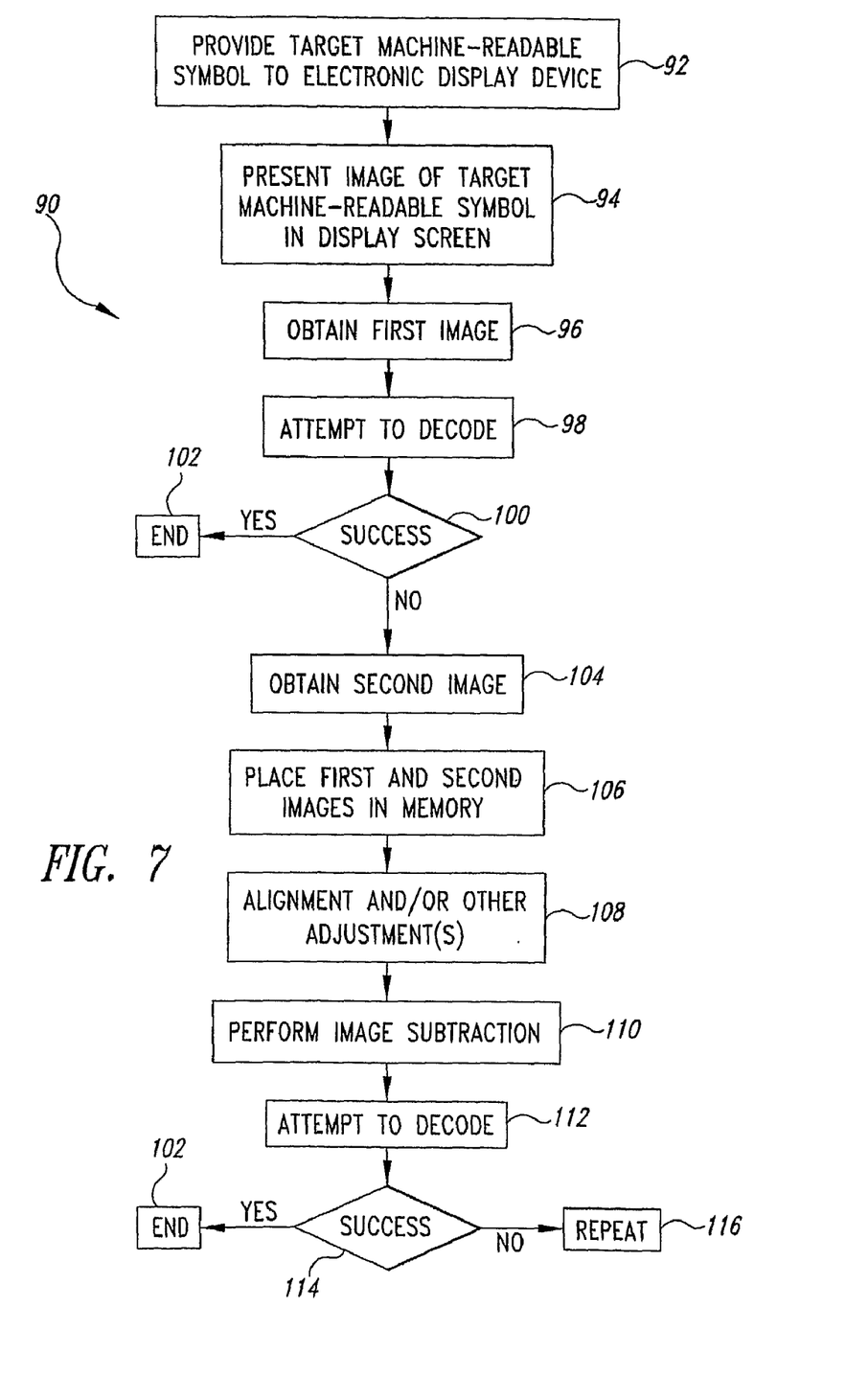
FIG. 7 is a flowchart of an embodiment of a method for reading a machine-readable symbol from a display screen of an electronic display device.

FIG. 7 is a flow diagram 90 of an embodiment of a method to reduce noise or otherwise improve the quality of the image of the matrix code symbol 12 using image subtraction. The various operations shown in the flow diagram 70 need not necessarily occur in the exact order shown. Moreover, it is possible to add, remove, modify, and/or combine operations in other embodiments.

In one embodiment, certain operations in the flow diagram 90 can be embodied in software or other machine-readable instructions stored on one or more machine-readable media and executable by one or more processors. For example, an image subtraction algorithm can be stored as software in the ROM 40 and executable by the microprocessor 34.

Beginning at a block 90, a target machine-readable symbol is provided to the electronic display device 24. As previously explained above, there are various possibilities for providing the matrix code symbol 12 or other target machine-readable symbol to the electronic display device 24, such as capturing via a built-in camera, retrieving from local storage, receiving via email, and so forth. The electronic display device 24 can be a portable or non-portable device, as explained above.

At a block 94, an image of the target matrix code symbol 12 is presented on the display screen 22 of the electronic display device 24. As explained above, the image can be displayed using a certain flashing rate, as a static image, a rasterized image, a macroblock image, a refreshed image with blanking intervals, other intermittently presented image, and/or other image presentation format.

At a block 96, the automatic data collection device 10 obtains a first image, such as an image of the display screen 22 having the image of the matrix code symbol 12 displayed therein. An example of the first image is the overall image 70 in FIG. 3 that includes the image 72 of the matrix code symbol 12. Furthermore and if appropriate, the image (such as the image 80 in FIG. 5) may be enlarged to compensate for screen texture, prior to image acquisition by the data collection device 10.

The data collection device 10 attempts to decode the image 72 at a block 98. If the decoding is successful at a block 100 to decode the underlying data in the matrix code symbol 12, then the method ends at a block 102. However, due to noise (as a result of lighting problems, texture and other screen microstructures, scratches, text, reflections, and/or various factors) that may adversely affect the quality of the image 72, the data collection device 10 may not be able to successfully decode the matrix code symbol 12 at the blocks 98 and 100.

Therefore, the data collection device 10 obtains a second image of the display screen 22 at a block 104. As explained above, the second image does not include the image 72 of the matrix code symbol 12. Rather the second image includes an image of the display screen 22 along with the associated noise and perhaps other extraneous image portions (e.g., partial images of the areas of the electronic display device 24 lying off the display screen 22) that are irrelevant to the decoding process. The display screen 22 may be activated or deactivated at the block 104.

Moreover at the block 104, the second image having the image of the display screen 22 may be obtained during a blanking interval, when the image 72 of the matrix code symbol 12 is "flashed OFF," or during any other suitable time period when the image 72 is not rendered in the display screen 22. Also, the second image should be taken at the block 104 with the data collection device 10 having a same distance and/or orientation, relative to the display screen 22, as the first image obtained at the block 96. However, this condition between the first and second images is not required in an embodiment of the data collection device 10 that can perform adjustments, as will be explained below.

At a block 106, the first and second images are placed in memory, if such images have not yet been previously placed in memory. The RAM 36 can be used to store the first and second images, thereby allowing operations to be performed on the stored images.

Image alignment and/or other adjustments can then be performed at a block 108. For instance, a pixel-by-pixel alignment between corresponding pixels of the first and second images may be performed to ensure that the correct image portions are subtracted from each other during the image subtraction process. To align the two images, all pixels may be aligned, or just landmark pixels may be aligned. Example of landmark pixels include, but are not limited to, a pixel in the center of the display screen 22, pixels that delineate the perimeter of the image 72 of the matrix code symbol 12, corner pixels, or other suitable pixels that can be used as reference pixels for alignment purposes.

As previously discussed above, there may be situations in which the data collection device 10 may not have had the same distance and/or orientation relative to the display screen 22 when obtaining the second image at the block 104, as compared to a distance and/or orientation of the data collection device 10 when obtaining the first image at the block 96. As a result, the second image may be larger (or smaller) relative to the first image, if there was a difference between distances. The other possible result is that the first image may be askew relative to the second image (or vice versa).

Therefore at the block 108, the adjustments can involve scaling one or both of the images to change image size, so as to improve the pixel-to-pixel correspondence between the images. In a situation where one image may be askew relative to the other image, image processing techniques may be implemented to compensate for the skewing so as to improve the pixel-to-pixel correspondence between the images. Alternatively or additionally, if such adjustments provide no improvement or if the data collection device 10 cannot perform such adjustments, then an audio or visual indicator may be provided by the data collection device 10 to the user to provide notification of the error and to request the user to repeat the image acquisition in block 96 and/or block 104.

In an embodiment, alignment and/or other adjustments may not be necessary at the block 108. For example, there may be a sufficiently fast repetition rate in the presentation and acquisition of images. In such a case, there may be a number of possible multiple images that are available for selection for the image subtraction process, such that the best-aligned images can be selected.

Image subtraction is performed at a block 110. In one embodiment, the second image is subtracted from the first image (or vice versa) using a pixel-to-pixel subtraction operation. Other embodiments may use a different type of image subtraction technique.

In one embodiment, the pixel subtraction operation takes two images (e.g., the first and second images) as inputs and produces a third image as an output. The pixel values of the third image comprise those of the first image minus the corresponding pixel values from the second image (or vice versa). In some embodiments, the pixel subtraction operation outputs an absolute value of the difference between pixel values, while other embodiments produce a signed output.

In an embodiment, the image subtraction at the block 110 is performed in a single set of operations. The output pixel values R of the third (resulting) image are given by:

$$R(i,j)=P_1(i,j)-P_2(i,j),$$

wherein $P_1$ and $P_2$ are the values of the pixels of the first and second images, respectively. The pixel values $R(i,j)$ can be absolute values of the differences, or they can be signed values.

If the pixel values $P_1$ and $P_2$ in the input images are actually vectors (e.g., for color images) rather than scalar values (e.g. for grayscale images), then the individual components (e.g. red, blue, and green components or other color components) can be subtracted separately to produce the output values.

Whether or not to use signed output values or absolute output values can depend on the type of pixel value format supported by the decoding and other image processing capability of the data collection device 10. For embodiments of the data collection device 10 that operate with image formats that support negatively valued pixels, then the negative values of $R(i,j)$ are usable, and the manner in which such pixels are to be displayed can be determined according to a color map or other transformation.

If the image format of the data collection device 10 does not support negative numbers, then the values of $R(i,j)$ can be placed in the form of absolute values. In other embodiments, negatively valued pixels can be set to zero (e.g., black, or white). Alternatively or additionally, offset values may be used to avoid or otherwise compensate for negatively valued results. Still alternatively or additionally, the subtraction operation may "wrap" negative values, so that for instance, a value of −30 appears in the output as +226 or other positively numbered pixel value.

One reason for using absolute values of the differences/result, if the two input images use a same pixel value type, is that it is impossible for the output pixel values to be outside a range that may be represented by the input pixel type. Therefore, overflow or other types of computation errors can be avoided. However, it is appreciated that the embodiments of the data collection device 10 are not limited to using absolute values.

The third (resulting) image is obtained after performing the image subtraction at the block 110. An example of the resulting image is the image 74 in FIG. 4.

The data collection device 10 attempts to decode the resulting image at a block 112. If the decoding is successful at the block 112, then the method ends at the block 102.

However, if the decoding is unsuccessful, then an embodiment repeats at least some of the operations described above at a block 116. For example, the data collection device 10 may inform the user of the unsuccessful decoding, and request the user to repeat the image acquisition at the blocks 96 and 104 so that a new set of images can be obtained and subtracted.

Alternatively or additionally, the repetition at the block 116 can be adaptive in nature. For example, if the data collection device 10 is not able to decode the third image, then another image of the display screen 22 (with the image 72 of the matrix code 12 being absent) is obtained at the block 104. Then, that image (or fractional portions of the pixel values in that image) is subtracted from the previously obtained third image, thereby providing a further improvement to the third image. Still alternatively or additionally, the pixel values subtracted from the third image at the block 116 can comprise mean pixel values, averaged pixel values, offset pixel values, constant pixel values, or other pixel values (whether or not derived from the repeat image of the display screen 22 without the image 72 of the matrix code symbol) that can be used to reduce noise from the third image.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, the various embodiments have been described above with the target machine-readable symbol being the matrix code symbol 12. The target machine-readable symbol can be a barcode, stacked code, or other type of machine-readable symbol. Furthermore, other operations can be performed in addition to the image subtraction, including image cropping or other image manipulation.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable with an imager type automatic data collection device, the method comprising:
    obtaining a first image of a display screen of an electronic display device, the first image including noise and an image of a target machine-readable symbol that is affected by the noise;
    obtaining a second image of the display screen, the second image having the image of the target machine-readable symbol absent therefrom and including the noise; and
    subtracting the second image from the first image to substantially remove the noise and to obtain a third image that includes a resulting improved image of the target machine-readable symbol.

2. The method of claim 1 wherein obtaining the first and second images of the display screen of the electronic display device includes obtaining the first and second images of the display screen of a wireless electronic display device.

3. The method of claim 1 wherein obtaining the first and second images of the display screen of the electronic display device includes obtaining the first and second images of the display screen of a wired electronic display device.

4. The method of claim 1 wherein subtracting the second image from the first image includes performing a pixel-to-pixel subtraction of corresponding pixel values between the first and second images.

5. The method of claim 4 wherein performing pixel-to-pixel subtraction includes:
    obtaining corresponding output pixel values from the pixel-to-pixel subtraction; and
    obtaining absolute pixel values from the output pixel values.

6. The method of claim 4 wherein performing pixel-to-pixel subtraction includes:
    obtaining corresponding signed output pixel values from the pixel-to-pixel subtraction; and
    transforming the signed output pixel values to pixel values that can be presented in the resulting improved image.

7. The method of claim 1 wherein obtaining the first and second images that include the noise comprises obtaining images that are affected by one or more of a lighting problem, a reflection, a scratch on the display screen, a microstructure of the display screen, text presented on the display screen, and image portions that are irrelevant to a decoding of the target machine-readable symbol.

8. The method of claim 1, further comprising adjusting either or both the first and second images prior to subtracting.

9. The method of claim 8 wherein adjusting includes aligning the second image relative to the first image.

10. The method of claim 1 wherein obtaining the second image includes timing acquisition of the second image in between intermittent presentation of the image of the target machine-readable symbol in the display screen.

11. The method of claim 1 wherein obtaining the first image that includes the image of the target machine-readable symbol includes acquiring an image of a matrix code symbol.

12. An automatic data collection apparatus usable to read a target machine-readable symbol, the apparatus including:
    a sensor adapted to obtain a first image of a display screen of an electronic display device, the first image including a first image portion having an image of the target machine-readable symbol and having noise, the sensor further being adapted to obtain a second image of the display screen, the second image including a second image portion having the noise, the image of the target machine-readable medium being absent from the second image;
    a memory coupled to the sensor to store the obtained first and second images that respectively include the first and second image portions; and
    a processor coupled to the memory to obtain a difference between the stored first and second image portions, the difference representing the image of the target machine-readable symbol at least partially devoid of the noise.

13. The apparatus of claim 12 wherein the processor is further coupled to the memory to perform an adjustment of either or both of the stored first and second images, including adjustment of an alignment between the first and second images.

14. The apparatus of claim 12 wherein the processor is coupled to the memory to obtain the difference by subtracting pixel values of one of the stored images from corresponding pixel values of an other of the stored images.

15. The apparatus of claim 12 wherein the processor is adapted to control timing of the sensor to obtain the second image in between intermittent presentation of the first image, having the image of the target machine-readable symbol, by the display screen.

16. The apparatus of claim 15 wherein the timing of the sensor is at least equal to or greater than a rate of intermittent presentation of the first image by the display screen.

17. The apparatus of claim 15 wherein the processor is adapted to control timing of the sensor to obtain the second image in response to manual user activation.

18. An automatic data collection system usable to read a target machine-readable symbol, the apparatus including:
   sensor means for acquiring a first image that includes a first image portion having an image of the target machine-readable symbol and having noise, the sensor means further being adapted for acquiring a second image that includes a second image portion having the noise, the image of the target machine-readable medium being absent from the second image; and
   means for obtaining a difference between the first and second image portions, the difference representing the image of the target machine-readable symbol at least partially devoid of the noise.

19. The system of claim 18 wherein the means for obtaining the difference includes subtraction means for subtracting pixel values associated with the second image from corresponding pixel values associated with the first image, the system further including means for using output pixel values that result from the subtraction by the subtracting means to generate the image of the target machine-readable symbol that is at least partially devoid of the noise.

20. The system of claim 18, further comprising adjustment means for adjusting either or both the first and second images, including aligning the first and second image portions relative to each other.

21. The system of claim 18, further comprising:
   an electronic display device means for obtaining the image of the target machine-readable symbol to be acquired by said sensor means; and
   a display means associated with the electronic display device means for intermittently presenting the obtained image of the target machine-readable symbol in a manner that the presented image can be acquired by the sensor means.

22. The system of claim 18, further comprising:
   decoding means for decoding the image of the target machine-readable symbol that is at least partially devoid of the noise; and
   additional means for supporting operation of the decoding means and sensor means.

23. An article of manufacture for an imager type automatic data collection device, the article of manufacture comprising:
   a storage medium having instructions stored thereon that are executable by a processor of said automatic data collection device to read a target machine-readable symbol, by:
      obtaining a first image of a display screen of an electronic display device, the first image including an image of the target machine-readable symbol and image portions that are irrelevant to decoding of the target machine-readable symbol;
      obtaining a second image of the display screen that includes the image portions that are irrelevant to the decoding of the target machine-readable symbol, the image of the target machine-readable symbol being absent from the second image; and
      obtaining a difference between the first and second images to substantially remove the image portions and to yield the image of the target machine-readable symbol.

24. The article of manufacture of claim 23 wherein the instructions to obtain the difference between the first and second images include instructions executable by said processor to read said target machine-readable symbol, by:
   subtracting the second image from the first image.

25. The article of manufacture of claim 24 wherein the instructions to subtract the second image from the first image include instructions executable by said processor to read said target machine-readable symbol, by:
   subtracting pixel values associated with the second image from corresponding pixel values associated with the first image.

26. The article of manufacture of claim 23 wherein the storage medium further includes instructions stored thereon that are executable by the processor to read the target machine-readable symbol, by:
   aligning the obtained first and second images relative to each other; and
   performing other adjustments to either or both the obtained first and second images to facilitate their alignment.

27. The article of manufacture of claim 23 wherein the instructions to obtain the first image that includes the image of the target machine-readable symbol include instructions executable by said processor to read said target machine-readable symbol, by:
   obtaining a magnified image of the target machine-readable symbol to distinguish geometric elements of the target machine-readable symbol from microstructures of the display screen.

28. The article of manufacture of claim 23 wherein the instructions to obtain the second image of the display screen that includes the image portions that are irrelevant to the decoding of the target machine-readable symbol include instructions executable by said processor to read said target machine-readable symbol, by:
   obtaining the second image having noise that distorts the image of the target machine-readable symbol.

29. The article of manufacture of claim 23 wherein the instructions to obtain the second image of the display screen that includes the image portions that are irrelevant to the decoding of the target machine-readable symbol include instructions executable by said processor to read said target machine-readable symbol, by:
   obtaining the second image having image portions that lie outside of the image of the target machine-readable symbol.

30. The article of manufacture of claim 23 wherein the storage medium further includes instructions stored thereon that are executable by the processor to read the target machine-readable symbol, by:
   repeating the obtaining of at least the second image; and
   using at least some values derived from the repeatedly obtained second image to further remove irrelevant image portions from the yielded image of the target machine-readable symbol.

* * * * *